Aug. 13, 1935. F. W. BROWN 2,011,211
DEVICE FOR SEPARATING FRUIT JUICE FROM PULP
Filed Oct. 20, 1933   3 Sheets-Sheet 2

Inventor:
Fred W. Brown,

Aug. 13, 1935.  F. W. BROWN  2,011,211
DEVICE FOR SEPARATING FRUIT JUICE FROM PULP
Filed Oct. 20, 1933   3 Sheets-Sheet 3
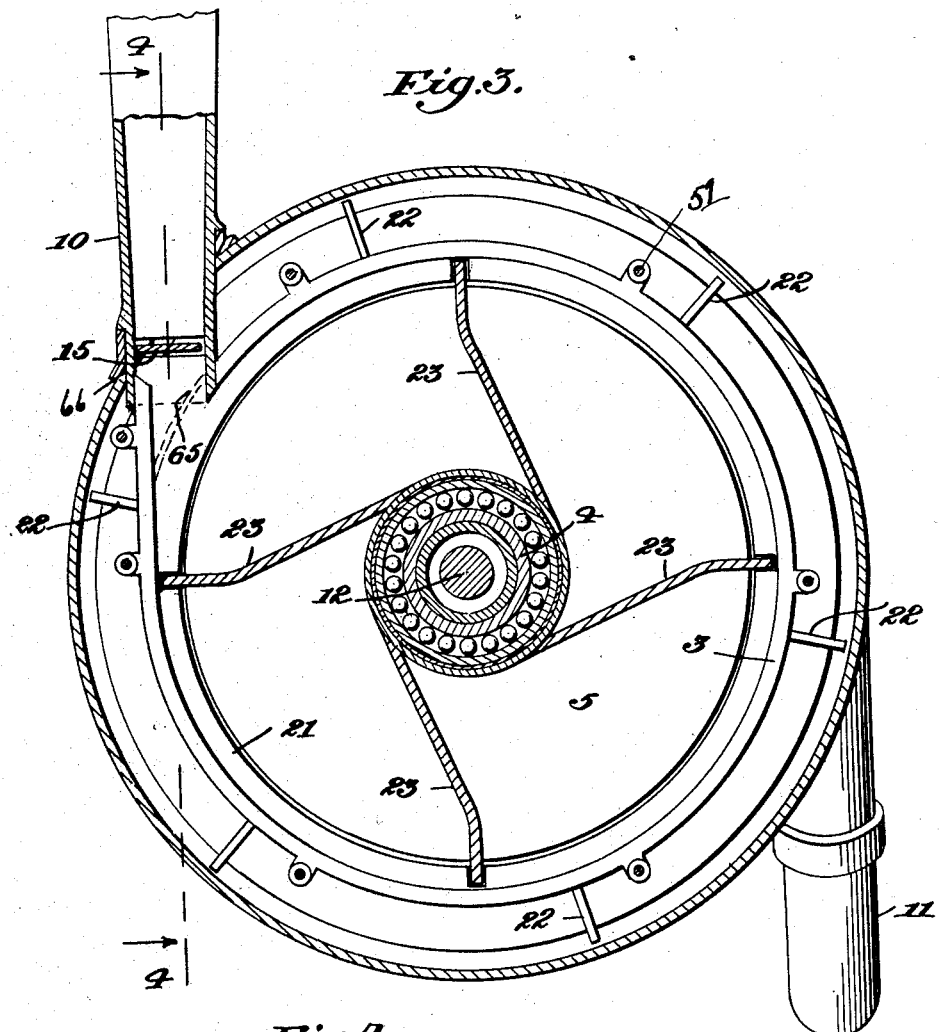
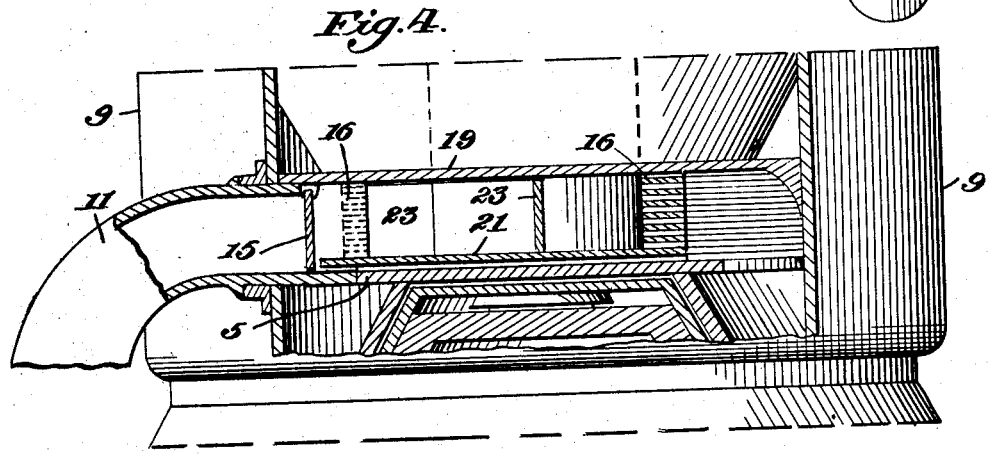
Inventor:
Fred W. Brown, Patented Aug. 13, 1935

2,011,211

UNITED STATES PATENT OFFICE 2,011,211

DEVICE FOR SEPARATING FRUIT JUICE FROM PULP

Fred W. Brown, Los Angeles, Calif.

Application October 20, 1933, Serial No. 694,498

15 Claims. (Cl. 146—3)

This invention relates to devices for separating juice from fruit pulp or seeds, and in particular to a device of this character which is useful in connection with citrous fruit juice extracting, although the means of separation herein disclosed is applicable to the separation of liquids from various other saturated materials.

The device forming the subject of this invention is useful in connection with power driven extractors in common use, which consist of a cone shaped reamer mounted on the end of a vertical motor shaft, and it is in connection with such reamer that the particular features of novelty of this invention relate.

One of the objects of the invention is to provide a fruit juice separating device of the character referred to in which the pulp or seeds, or both, are removed and separated from the juice, and in this connection the term "pulp" hereinafter used will include seeds also.

An object of the invention is to make the operation continuous and automatic so that the operator will not be interrupted in the separation through the necessity of manually straining the juice or removing the pulp while in the act of preparing fruit juices.

Another object of the invention is to cause the pulp and prepared juice to emerge under the impulse of an impelling force to accelerate action, since quick service is one of the main objects when dispensing juice.

Another object is to provide juice direct from the separator, strained to any required degree of separation and ready for consumption without the necessity of further straining.

Another object is to provide an apparatus of the class referred to in which the pulp is ejected through one outlet to an external receptacle, thereby preventing any accumulation of pulp within the machine, while the juice is discharged to another receptacle.

Another object of the invention is to provide an apparatus of the class referred to in which the pulp separating means is so designed as to render it impossible for a revolving unbalanced mass of pulp to accumulate and throw the machine out of balance.

Another object of the invention is to provide a pulp separating device with a removable strainer unit interchangeable with other straining units so as to vary the degree of pulp separation.

Another object of the invention is to provide a pulp separating device so designed that both the pulp and juice in the process of separation take a downward course within the machine to separate points of discharge, thereby eliminating the action of materials against gravity.

Another object of the invention is to provide a receiving hopper or bowl with a spirally inclined bottom that carries the saturated fruit pulp down into a lower chamber for separation, the bowl bottom serving as a cover to prevent the juice and pulp from splashing out over the top of the machine.

Another object of the invention is to provide a separator that will disintegrate the fruit to a greater extent than is accomplished by the reamer, thereby producing a greater percentage of the separated liquid and solid matters.

Other objects and advantages of the invention will be obvious from the following description, when considered in connection with the accompanying drawings, illustrating a device embodying the principles of the invention, and in which drawings:—

Fig. 3 is a horizontal section on the line 3—3 of Fig. 1,

Fig. 4 is a vertical section on the line 4—4. Fig. 3, and

Figure 1:
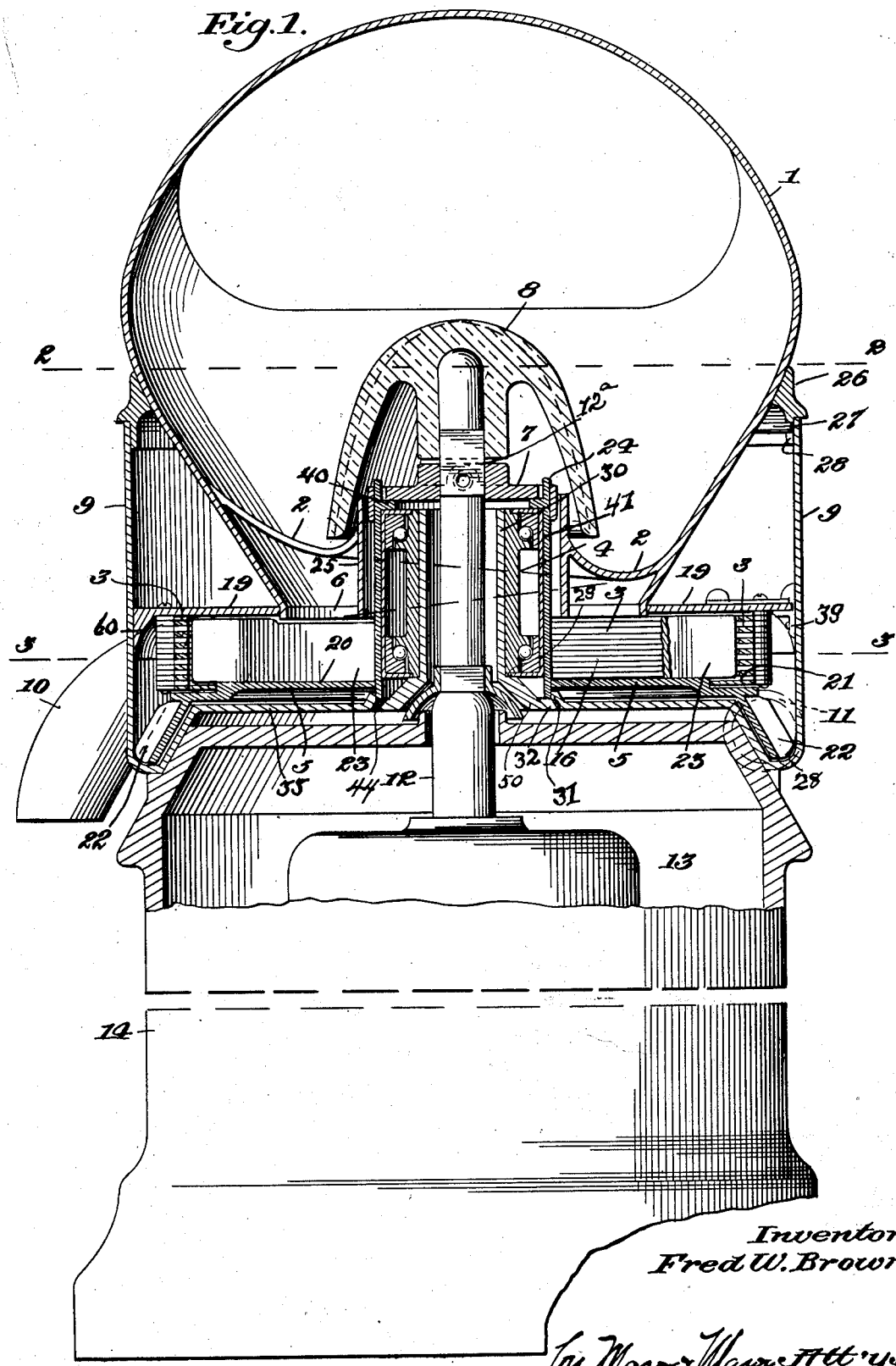
Fig. 1 is a view, partly in vertical section, of a fruit separator embodying the invention.

As herein shown the device comprises a complete unit, comprising a base 14 constituting a housing for enclosing a motor 13, the top of the housing having a central aperture through which extends the motor shaft 12. The upper end portion of the motor shaft is provided with a rectangular portion 12a, and over the end of this shaft fits a reamer 8, provided with the usual corrugations or irregularities upon its external surface, which grind the pulp of the fruit and cause the same to be deposited in the receiving bowl 1.

The reamer 8 is provided with a socket which fits over the end of the shaft 12, and said socket is in part formed rectangular to receive the portion 12a of the shaft 12, thereby preventing relative rotation between the reamer and shaft. The receiving bowl or hopper 1 is provided with a spirally arranged bottom 2, having an opening 6 therein through which the pulp and juice are conducted downwardly and discharged into a space interiorly of the strainer 3, the interior lower portion of the bowl having a cylindrical hub 25, which surrounds the rotary bearing assembly, by which the impeller is suspended, and upon which it rotates, as hereinafter more fully described.

The bowl 1 is supported upon the body 9 of the separator by a ring 26, secured to the bowl, and provided with a slot 28 which fits over a pin 27 projecting laterally from the body 9, such slot and pin preventing relative rotation of the bowl and body 9.

Figure 2:
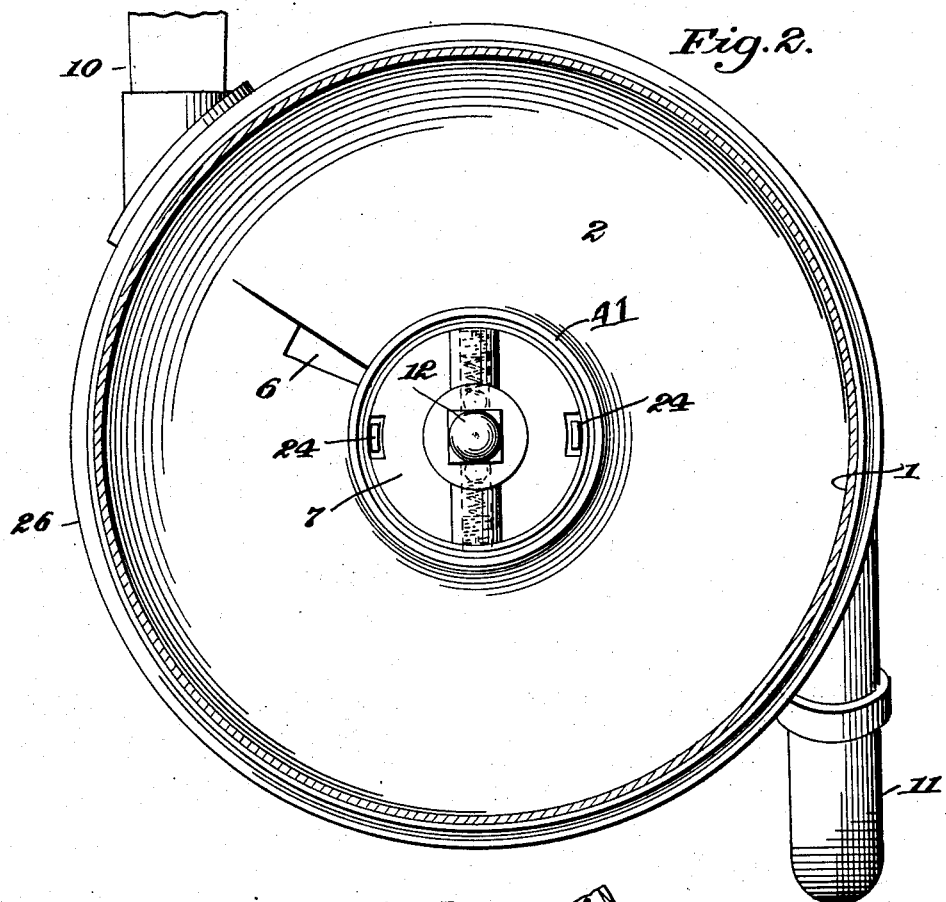
Fig. 2 is a horizontal section on the line 2—2 of Fig. 1.
Figure 5:
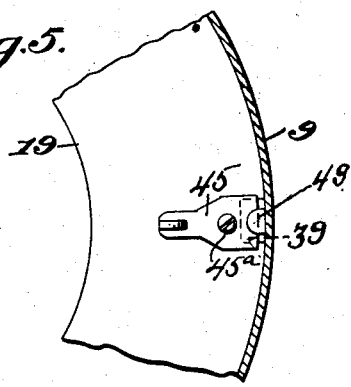
Fig. 5 is a sectional detail view as herein shown.

The rotating impeller 5 comprises a bottom, 20, downwardly projecting portions 22 which are formed as juice impeller blades and rotate in an annular depression or recess 28 formed in the body 9, the latter having a bottom portion 33 with an upwardly projecting rim or flange 31, acting as a grease barrier, and grease discharging apertures 32 formed adjacent the barrier 31. The bottom 33 of the separator body is provided with an upwardly projecting tubular column 30, having an annular shoulder 29 forming a seat for the inner hub of the bearing 4. The bottom portion 33 of the body is also provided with an annular web 50, shown herein as inclined, and connecting said bottom with the tubular column or standard 30. The impeller 5 is provided with a cylindrical hub portion 41 surrounding the bearing 4, and having an annular flange 40 which overlaps the top of the movable portion of the bearing, said bearing and impeller being connected for rotation together. The hub 41 of the impeller is provided also with upwardly projecting lugs 24 which enter slots in a coupling member 7, the latter also resting upon the flange 40. The impeller is thus suspended on the bearings through this flange, which in turn supports the coupling 7, keyed to shaft 12, the connection between said coupling and the impeller being rendered somewhat flexible by springs and balls, the latter seated in recesses in the side of the shaft 12, as indicated in Fig. 2.

The bottom portion of the impeller 5 is provided near its outer circumference with an annular depression which receives the strainer bottom plate 21, and the strainer is composed of a plurality of superposed rings 16, slightly spaced apart, and secured by bolts 51 between the strainer top plate 19 and bottom plate 21. The several parts just described constitute the strainer assembly which is inserted in position surrounding the blades 23, which are secured to the hub 41 and bottom of the impeller, and rotate with the latter, the impeller being, as described, suspended upon the movable members of the bearing assembly 4, and rotating with the motor shaft 12 and reamer 8, through power applied by the motor.

The cover plate 19 of the strainer assembly is provided with curved portion or flange 60, which acts to direct the fruit juice downwardly as it is thrown centrifugally outward beyond the strainer, the juice being discharged into an annular passageway 28, and the blades 22 in said passageway, which are carried by the impeller, sweep the juice outwardly into the discharge 11, which is tangentially arranged with respect to the body 9.

The pulp which is retained within the strainer assembly is carried around by the impeller blades 23, and discharged through the outlet 10, which is arranged at a higher level than the juice outlet 11, and is provided with a hinged gate or valve 15, pivoted at its upper portion. This valve will open under the outward pressure of the pulp while the same is being discharged, but will close in the event of any back pressure in the pulp discharge conduit 10.

The interior portion of the body 9 is provided with a bracket 39 and at a suitable point above this bracket is located a lug 49, between which bracket and lug a latch 45, pivoted at 45a, is operated to retain the strainer assembly in position on the body.

It will be observed from the foregoing that the bearings 4 are of the ball type; are self-contained, and are removable as a complete unit. The cylindrical bearing housing is so designed that the outer shell of the bearing revolves around the inner shell with a seal at the junction of the two parts to prevent leakage. The bearings are grease packed and designed to conform with commercial practice in the manufacture of self-enclosed leak-proof ball bearings.

The coupling 7 between the motor shaft and impeller serves the combined purpose of transmission of power from the motor shaft to the impeller and as a cap or cover to protect the bearings and prevent water from spilling into the hub enclosure when the machine is being flushed for cleaning while running.

The receiving hopper or bowl 1 can be of any desired design at the top to allow free access by the operator for reaming the fruit. The design herein illustrated is of the dome shape with an opening on one side. The bowl seats on the rim of the body and slopes down to and slightly past the inner circle of the top plate 19 of the strainer assembly within which it is shown as fitting. The floor of the bowl starts at an elevation as close as possible to the lower end of the reamer, and slopes spirally down in a complete circle to the impeller chamber. The floor connects with the inner wall of the bowl and extends upwards and surrounds the impeller hub at a point under the lower rim of the reamer. The disintegrated fruit juice as it comes from the reamer emerges from under the outer shell of the fruit with a vigorous sweeping movement that carries it rapidly down the sloping floor to the pulp chamber. To secure the full sweep of the pulp along the walls of the strainer rings, the pulp must be picked up by the impeller blades 23 so that the arrival of the saturated pulp and of the impeller blade at the beginning of the wall of the strainer rings will be simultaneous. Proper adjustment to secure this result is obtained by rotating the bowl on the rim of the body to a point where there exists a correct relation in position between the opening 6 at the bottom of the bowl and the pulp opening in the strainer wall which leads to the discharge conduit 10. The bowl is held in this position by a suitable fastener at the top of the body or seat.

The outlets 10, 11, can be located in any relative position providing their individual requirements for location in the body are maintained. Preferably, the juice outlet is located on the left of the operator in plain view of the consumer. Preferably, the pulp outlet is located to the right of the operator and can lead to a receptacle near the extractor, or extend down underneath allowing the pulp to be deposited out of sight. The juice outlet should extend so that its general direction is at a tangent to the annular juice channel. Since the juice is vigorously impelled along its course, a small deviation in direction would make no appreciable difference.

The pulp outlet is located with its floor passing over the juice channel, and under the lower plate of the strainer wall. The near wall 66 of the pulp outlet 10 must be on a plane tangent to the outer circle of the strainer wall, so that the bars of the strainer will project within the throat of the outlet. The far wall of the outlet covers the ends of the rings at their beginning. The floor of the outlet drops downward as soon as it extends through the body wall. The retarding gate in the outlet throat offers very little resistance to the emergence of pulp, but is sufficient to constantly retain a small residue of pulp which, in theory, acts as a seal against leakage of juice in case of improper adjustment of the bowl. In actual practice, it is probable that the gate could be eliminated since the position of the bowl would be predetermined and fixed at the factory.

The mechanism as above described, can be easily and rapidly assembled and disassembled, without the use of tools or complicated fasteners. It can be easily cleaned while in motion by throwing a small amount of water in the bowl. Or it can be cleaned by quickly taking apart, by removing the bowl, impeller and strainer.

Various changes may be made in the arrangement of parts, or in the particular form of the various elements disclosed herein, without departing from the spirit of the invention, and the right is reserved to make such changes as fall within the scope of the following claims.

What I claim is:—

1. In an apparatus of the class described, the combination of a receptacle, a reamer therein, means for discharging fruit pulp from said receptacle, an annular strainer below said reamer, a rotary impeller having pulp discharging blades located within said strainer and separate tangential discharge means for conducting fruit juices and pulp after separation from said apparatus to points of discharge outside and away from said apparatus.

2. A device of the class described having, in combination, a bowl, a rotatable reamer therein, discharge means from said bowl, a rotary impeller having pulp discharging blades located within said strainer, an annular strainer assembly below the bowl, and separate conduits for discharging the pulp from within the strainer and the juice from without the strainer in directions substantially tangential to the periphery of said strainer.

3. A device of the class described having, in combination, a receiving bowl for fruit pulp having a discharge in its bottom portion, a reamer therein, means for rotating the reamer, a rotary impeller below said bowl, having pulp discharging blades rotatable simultaneously with said reamer, a strainer surrounding said impeller, and separate conduits for discharging the pulp interiorly from said strainer, and the juice exteriorly thereof.

4. A device of the class described having, in combination, a receiving bowl for pulp, a rotatable reamer therein, a rotary bladed impeller located below said reamer, a strainer surrounding said impeller, said impeller adapted to eject said pulp centrifugally against the interior of said strainer, a conduit connected with the interior of said strainer for discharging the pulp, and another conduit located exteriorly of said strainer for discharging the separated liquid from said pulp.

5. A device of the class described, having in combination, a receiving bowl having a discharge opening in its lower portion, a rotatable shaft located therein and having a reamer thereon, an impeller suspended on suitable bearings from said shaft located below said bowl and provided with blades, a strainer below said bowl to receive said pulp, said strainer surrounding said impeller, means for discharging the pulp from the interior of said strainer, and separate means for discharging the liquid from the exterior of said strainer.

6. A device of the class described having, in combination, a motor housing, a motor therein having a rotatable shaft, a bowl supported upon said housing, a reamer within said bowl supported by said shaft, spiral discharge means from said bowl, a rotary impeller suspended from said shaft, bearings for said impeller, radially disposed blades on said impeller, an annular strainer below said bowl to receive pulp discharged therefrom, said strainer surrounding said impeller, tangential discharge means for pulp communicating with the interior of said strainer, and tangential discharge means for separated liquids communicating with the exterior of said strainer.

7. A device of the class described having, in combination, a housing, a bowl supported thereon and provided with a spiral discharge in the bottom thereof, a rotatable shaft projecting in said bowl, a reamer supported upon said shaft, an impeller suspended by flexible coupling means from said shaft, bearings for rotatably supporting said impeller, an annular strainer below said bowl to receive pulp discharged therefrom, said strainer composed of a plurality of superimposed spaced rings surrounding said impeller, means for discharging pulp from the interior of said strainer, and separate means for discharging liquids from the exterior of said strainer.

8. A device of the class described having, in combination, a rotatable shaft, a housing, a bowl supported upon said housing and provided with a discharge for pulp in the bottom thereof, a reamer mounted upon said shaft, a rotatable impeller supported from the shaft below said bowl, an annular strainer located below and surrounding said impeller, blades connected with said impeller for imparting centrifugal motion to the contained pulp, an annular passage surrounding said strainer for receiving the separated liquids, and blades connected with said impeller and movable in said annular passage for discharging the separated liquid.

9. A device of the class described having, in combination, a housing, a pulp receiving bowl supported thereon and provided with a spiral discharge in its bottom, a rotatable shaft located centrally in said bowl and having a reamer thereon, an impeller below said bowl for receiving discharged pulp, impeller blades for imparting centrifugal motion to the pulp in said impeller, a strainer surrounding said blades, and other impeller blades located exteriorly and below said strainer for imparting motion to the separated liquids.

10. A device of the class described having, in combination, a housing, a motor therein having a shaft projecting upwardly therefrom, a body member sustained upon said housing and enclosing said shaft, a bowl supported by said body member, a reamer in said bowl attached to said shaft, a spiral discharge in the bottom of said bowl, a rotary impeller having a plurality of radial blades disposed below said bowl, a cylindrical hub connected with said impeller, a flexible coupling between said shaft and hub, bearings between said hub and shaft for rotarily supporting said impeller, an annular strainer below said bowl to receive pulp discharged therefrom, said strainer surrounding said impeller, means for detachably securing said strainer to said body, a passage in said body located below said strainer, impeller blades for the separated liquids connected with said impeller and travelling in said passage, discharge means for pulp communicating with the interior of said strainer, and discharge means for separated juice connected with said annular passage and located exteriorly of said strainer.

11. In a device for separating juice from fruit pulp, the combination of a casing, a receiving bowl supported thereon having its lower end portion open and contracted, the bottom of the bowl being located above said end descending in a spiral to an outlet for the saturated pulp, a cylindrical hub located centrally of and connected with said bottom, a reamer supported upon a rotatable shaft above said bottom and having its lower edge overlapping the upper edge of said hub and spaced slightly from said hub and the bottom of said bowl, a strainer assembly below said bowl, and comprising a top plate having a central opening fitting snugly about the lower end of the bowl, spaced strainer rings below said plate, a bottom plate, means for securing the strainer rings between said plates, and means for supporting the top plate from the interior of said casing.

12. In a device for separating fruit juices from saturated pulp, a casing, a bowl supported thereon and tapering towards its open lower end, a pulp receiving bottom for said bowl located above said lower end and inclined spirally downward to a discharge opening, a strainer assembly located below and surrounding the discharge opening from said bowl and comprising top and bottom plates and intermediate spaced strainer rings, the top plate of said strainer fitting within said casing and provided with a curved flange to direct the fruit juice downwardly as it is thrown centrifugally outward beyond the strainer, and means rotatably sustained within said strainer for moving said pulp centrifugally outward against the strainer in separating the liquid from the solid constituents of the pulp.

13. In a device of the class described, the combination, of a housing, a bowl supported thereon having a discharge opening in its bottom, a rotatable reamer within said bowl, an impeller below said bowl, bearing means between said impeller and reamer operating shaft, and an annular strainer below said bowl to receive pulp discharged therefrom, said strainer composed of a series of spaced rings surrounding said impeller, with readily detachable means between said strainer and housing whereby strainers of different sizes may be substituted at will.

14. A device of the class described having, in combination, a housing, a bowl supported thereon, an operating shaft extending centrally through said bowl, a reamer on said shaft, a floor in said bowl located above its lower end and in close proximity with said reamer, said floor being spirally wound around said shaft, a discharge for pulp therefrom, an annular strainer below said bowl to receive said pulp, and an impeller located interiorly of said strainer and arranged for rotation with said reamer to project the pulp forcibly against the interior walls of said strainer.

15. In a device of the class described, the combination, of a housing, a bowl supported thereon having a discharge opening in its bottom, a reamer above said bowl, an operating shaft for said reamer, an annular strainer below said bowl, an impeller within said strainer, and means for connecting said impeller with said shaft including a coupling member of disk form with flexible means between said shaft and member, said member being constructed to prevent leakage of fluids from said bowl, a bearing surrounding said shaft, and means connecting said bearing with said impeller.

FRED W. BROWN.